United States Patent [19]

Godard et al.

[11] 4,293,029
[45] Oct. 6, 1981

[54] TEMPERATURE CONTROL DEVICE FOR A HEAT PUMP

[75] Inventors: Pierre Godard, Tremblay Les Gonesse; Jean-Claude Geoffroy, Drancy, both of France

[73] Assignee: Saft-Societe des Accumulateurs Fixes et de Traction, Romainville, France

[21] Appl. No.: 60,185

[22] Filed: Jul. 24, 1979

[30] Foreign Application Priority Data

Jul. 31, 1978 [FR] France ................................ 78 22616

[51] Int. Cl.³ ............................................ F25B 29/00
[52] U.S. Cl. ......................................... 165/29; 62/3; 62/150
[58] Field of Search ........................ 165/29; 62/3, 150

[56] References Cited

U.S. PATENT DOCUMENTS 3,241,603  3/1966  Nagata ................................... 165/29
3,261,395  7/1966  Foster et al. .......................... 165/29

Primary Examiner—Albert W. Davis
Attorney, Agent, or Firm—Kenyon & Kenyon

[57] ABSTRACT

A heat control device for a space heated primarily by means of a heat pump and having an auxiliary makeup heater comprises a room temperature measurement circuit (100), a makeup heat control circuit (200), a current control circuit (500) of a heat pump, and a measurement circuit (600) of the temperature of the exchange fluid of the pump whose information is transmitted both to the circuit (200) and to the circuit (300).

Application to household heating.

3 Claims, 5 Drawing Figures

TEMPERATURE CONTROL DEVICE FOR A HEAT PUMP

The present invention relates to a device to control the temperature of a space, such as a building or a room, heated mainly by means of a heat pump, but having also a makeup heat device.

For convenience of explanation, it will be assumed hereinafter that the heat pump is a Peltier element pump through which an electric current $I_p$ is passing and that the variations in the intensity of said current cause corresponding variations in the amount of heat supplied by the pump. It is evident, however, that the use of other types of heat pump comes within the scope of the present invention. All that is required is that in the circuit of that pump there be an electric current, the control of which brings about the adjustment in the heat output of the pump.

For the same reason, it will be assumed that the makeup heat device comprises an electric circuit through which passes an electric current $I_R$ which varies in direct relation to the amount of heat supplied by the makeup heat device. The $I_R$ current may be the current that passes through electric radiators, and this is the example that will be selected hereinafter. However, alternatively it may be the supply current of a pump feeding a liquid fuel into an oil-fired or similar makeup heat apparatus.

One object of the invention is to control the temperature of a space, avoiding temperature oscillations about a preset temperature and without any operating surges of the heat pump.

Another object of the invention is to achieve a control of the temperature of a space, which will take into account the temperature of the fluid of the heat pump, which transfers calories from the cold source. This fluid will be referred to hereinafter as "exchanger fluid."

In a Peltier-effect pump, the exchanger fluid is generally water, provided in most instances with an antifreeze. Nevertheless, it is dangerous to let the temperature of said water fall below zero (°C.) due to the risk of frost buildup on the exchanger. Thus, the control device according to the invention also acts in the conventional way to reduce the current $I_p$ in the pump as soon as the temperature $\theta$ of the water drops below a given value $\theta_1 + \delta\theta_1$, $\theta_1$ being close to freezing temperature (for example, 1° C.) and $\delta\theta_1$ being a few degrees.

The lowering of the current $I_p$ reduces the amount of heat taken by the water from the cold source and thereby makes is possible to stabilize the temperature of said water. At the limit $\theta_1$, the current of the pump is shut off. In the range from $\theta_1$ to $\theta_1 + \delta\theta_1$, the current of the pump is a function of the water temperature $f_1(\theta)$.

The device is likewise designed to reduce the current of the pump as soon as the temperature $t$ of the space reaches a level close to the preset temperature $t_1$ of the space.

This temperature at which the current of the pump diminishes is equal to $t_1 - \delta t_1$. The pump current is shut off completely as soon as the local temperature reaches the level $t_1$.

To provide control stability, the device acts in a known manner to provide a pump current having the lower of two values, corresponding on the one hand to the value $\theta$ of the actual temperature of the exchange fluid of the pump and, on the other, to the actual temperature $t$ of the space.

The device functions in a known way to reduce the current of the makeup heater as soon as the temperature of the space reaches a level $t_1 - \delta t_2$ and to shut off said current completely as soon as the value reached is equal to $t_1 - (\delta t_2 - \delta t_3)$, where $\delta t_2$ is greater than $\delta t_3$.

The above temperature increments $\delta t_1$, $\delta t_2$ and $\delta t_3$ are intervals of a few degrees.

The invention includes therefore a device to control the temperature $t$ of a space heated by means of a heat pump operating with an exchange fluid at a temperature $\theta$, the value of which must not go below a temperature $\theta_1$, and by means of a makeup heater, $t_1$ being the space temperature desired to be achieved, wherein the device includes first means for limiting the current of the heat pump to the lower one of two values, the first one of said values being defined by an increasing function $f_1$ of $\theta$, when $\theta$ is between $\theta_1$ and $(\theta_1 + \delta\theta_1)$, $\delta\theta_1$ being a predetermined constant temperature increment of a few degrees; the second value being defined by a decreasing function $f_2$ of $t$, when $t$ is between a temperature $t_1$ and $t_1 - \delta t_1$, $\delta t_1$ being a predetermined constant temperature increment of a few degrees and the temperature $t_1$ being a value at which said current becomes zero. The device further includes second means to vary the current of the makeup heater as a decreasing function of $t$ when $t$ is between $t_1 - \delta t_2$ and $t_1 - (\delta t_2 - \delta t_3)$, $\delta t_2$ and $\delta t_3$ being predetermined temperature intervals of a few degrees and $\delta t_2 - \delta t_3$ being at all times positive, and to shut off the makeup heat as soon as $t$ reaches the value $t_1 - (\delta t_2 - \delta t_3)$, the device being characterized in that $\delta t_3$ is constant, and third means are provided to vary the value of $\delta t_2$ as a function of the current of the heat pump when the latter is operating in the zone where its current is limited by the temperature of the exchange fluid.

According to a specific embodiment of the invention, the temperature difference $t_1 - (\delta t_2 - \delta t_3)$ is chosen in such a way that, for each value $\theta$ of the exchange fluid temperature, the relation $f_1(\theta) = f_2(t_1 - (\delta t_2 - \delta t_3))$ in maintained, thereby keeping the heat pump current $I_p$ at the highest value compatible with the temperature $\theta$ for as long as the makeup heater current $I_R$ is not zero. Thereafter the heat pump current $I_p$ falls with rising space temperature $t$.

According to the invention, the temperature increment $\delta t_3$ is selected to be constant. In that way, the rate of decrease of the intensity of the makeup heat is the same, regardless of the temperature level from which such decrease commenced. In this way there is obtained a first factor favorable to surge-free control.

According to another characteristic of the invention, the range $\delta t_2$ is selected to be an increasing function of the pump current.

Preferably a value of $t_1 - (\delta t_2 - \delta t_3)$ is chosen to correspond, for a given value of the exchange fluid temperature $\theta_o$, to two equal values of the heat pump current $f_1(\theta_o) = f_2(t_1 - (\delta t_2 - \delta t_3))$.

Finally, it is simple, therefore advantageous, to choose the functions $f_1$ and $f_2$ to be linear functions of $\theta$ and $t$, respectively.

The invention will be better understood by way of the explanations given below with reference to the accompanying drawing in which.

Figure 1:
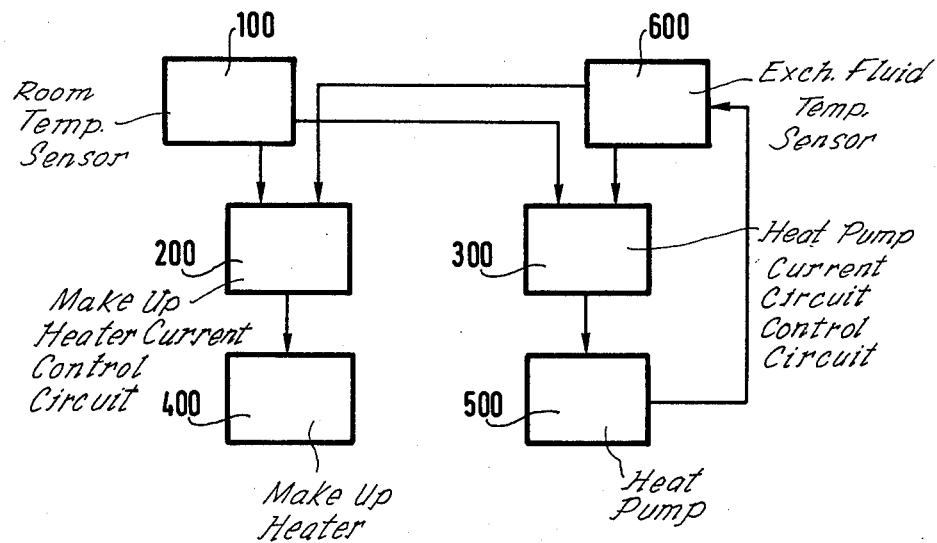
FIG. 1 is a block diagram of a device in accordance with the invention.

In FIG. 1, the box 100 symbolizes a measurement circuit of the space temperature. Information from circuit 100 is transmitted, on the one hand, to a circuit 200 for controlling the current $I_R$ of a makeup heater 400 and, on the other hand, to a circuit 300 for controlling the current $I_p$ of a heat pump 500. Box 600 symbolizes a measurement circuit for the exchange fluid temperature of the heat pump; the information from said circuit is transmitted both to circuit 200 for the control of the makeup heater current $I_R$ and to the circuit 300 for the control of the heat pump current $I_p$.

Figure 2A:
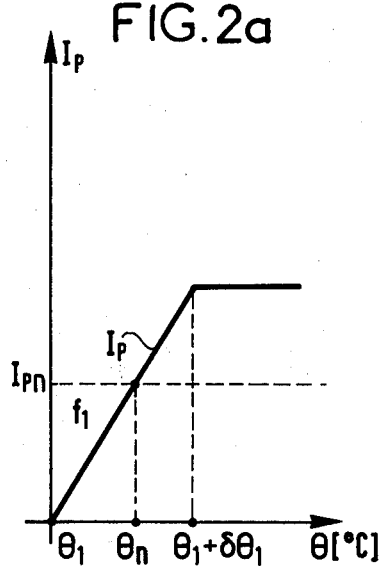
FIGS. 2a and 2b show two diagrams with regard to the operation of the device of FIG. 1.
Figure 2B:
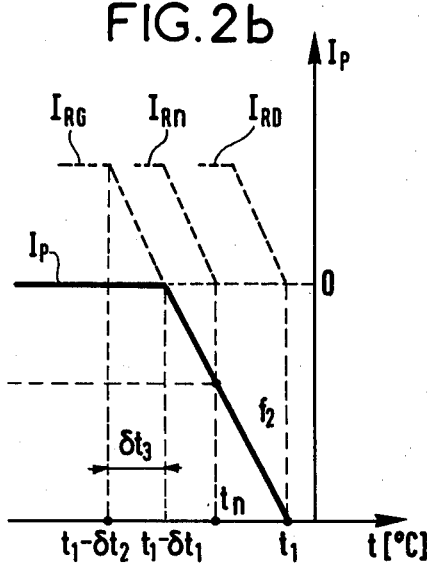

The diagrams of FIGS. 2a and 2b explain the operation of the invention. Along the abscissas, the temperature $\theta$ of the exchange fluid of the pump (FIG. 2a) and the temperature t of the space (FIG. 2b) are stated in degrees centigrade.

The solid curve in each diagram represents the current $I_p$ in the pump.

The current is regulated, on the one hand, by means of the information relating to the temperature $\theta$ of the exchange fluid and, on the other hand, by means of the information relating to the temperature t of the space. The value of the current $I_p$ is subjected to two limitations:

First, it must decrease as soon as the temperature of the exchange fluid falls below a given value $\theta_1 + \delta\theta_1$, to prevent any rick of icing and freezing, as pointed out above.

For example, $\theta_1$ may be equal to 1° C., and $\delta\theta_1$ may be equal to an increment of 4° C. The diagram of FIG. 2a shows the curve of the function $I_p = f_1(\theta)$ between $\theta_1$ and $\theta_1 + \delta\theta_1$ as an increasing function, which may be a straight line.

Secondly, the current $I_p$ in the pump must drop upon approaching the level of the preset temperature $t_1$ that is to be maintained in the space. This makes it possible to approach the preset temperature smoothly. The temperature level at which this decrease commences is $t_1 - \delta t_1$. For example, $t_1$ can be equal to 20° C. and $\delta t_1$ equal to a differential of 2° C. The diagram of FIG. 2b represents the function $I_p = f_2(t)$ between $t_1$ and $t_1 - \delta t_1$ as a decreasing function, that may be a straight line.

When the limits corresponding to the functions $f_1$ and $f_2$ are not applicable, the current $I_p$ of the heat pump has a constant value $I_p$ (max) chosen to provide optimum operation of the pump. This value is provided by the pump manufacturer.

The diagram of FIG. 2b shows the variation of the makeup heater current $I_R$. To obtain a smooth adjustment without overshoot, the makeup heater is provided to be used as follows:

(a) the value of the makeup heater current $I_R$ is kept constant if the temperature of the space is below the value $t_1 - \delta t_2$;

(b) $I_R$ is cut off if the temperature of the space is equal to or greater than a value of $t_1 - (\delta t_2 - \delta t_3)$, with $\delta t_2 - \delta t_3$ being always positive;

(c) $I_R$ follows a descending curve, which may be a straight line as previously stated, between said two values of the space temperature.

The temperature differential $\delta t_3$ is selected to be constant; it may be for instance 1° C.

However, according to one characteristic of the invention, $\delta t_2$ should be a function of the heat pump current. In other words the space temperature from which the current $I_R$ starts to be reduced (i.e. $t_1 - \delta t_2$) is a decreasing function of the current in the heat pump.

This arrangement makes it possible to control the space temperature by using the heat of the pump to the maximum extent and economizing on the more expensive makeup heat.

Since $\delta t_3$ was chosen to be constant, this is tantamount to having a family of curves $I_R$ (of straight lines $I_R$ in the case of a linear decrease as assumed in FIG. 2b) which are parallel to one another between an extreme curve $I_{RG}$ on the left of the diagram, corresponding to $\theta = \theta_1 + \delta\theta_1$ and an extreme curve $I_{RD}$ at the right-hand side, corresponding to $\theta = \theta_1$. This family of curves is governed by the above mentioned relationship $$f_1(\theta) = f_2(t_1 - (\delta t_2 - \delta t_3)):$$

when $\theta \leq \theta_1$ the relationship becomes to $0 = f_2(t_1)$, whence $t_1 - (\delta t_2 - \delta t_3) = t_1$, i.e. $\delta t_2 = \delta t_3$, so the heater current $I_R$ follows the curve $I_{RD}$, starting to drop at a space temperature $t_1 - \delta t_3$ and reaching zero at $t_1$;

when $\theta \geq \theta_1 + \delta\theta_1$ the relationship become $I_p$ (max) = $f_2(t_1 - \delta t_1)$ whence $\delta t_2 = \delta t_1 + \delta t_3$, so the heater current $I_R$ follows the curve $I_{RG}$, starting to drop at a space temperature $t_1 - \delta t_1 - \delta t_3$ and reaching zero at $t_1 - \delta t_1$; and when $\theta$ has an intermediate value $\theta_2$ corresponding to a heat pump current $I_{pn} = f_2(t_n)$, the heater current $I_R$ follows an intermediate curve between space temperatures $t_n - \delta t_3$ and $t_n$.

Thus the operation of the device may be summed up as follows:

so long as the temperature of the exchange fluid $\theta$ permits some current to be passed through the heat pump ($\theta > \theta_1$), there exists a space temperature $t_n$ above which the pump is capable of supplying all the heat needed to heat the space, and below which it is desirable that it be assisted by the makeup heater. The makeup heater current $I_{Rn}$ is therefore arranged to be zero at temperatures $t_n$ and above, to vary inversely with temperature in the last $\delta t_3$ degrees up to $t_n$, and to be at its maximum value at lower space temperatures.

Figure 3:
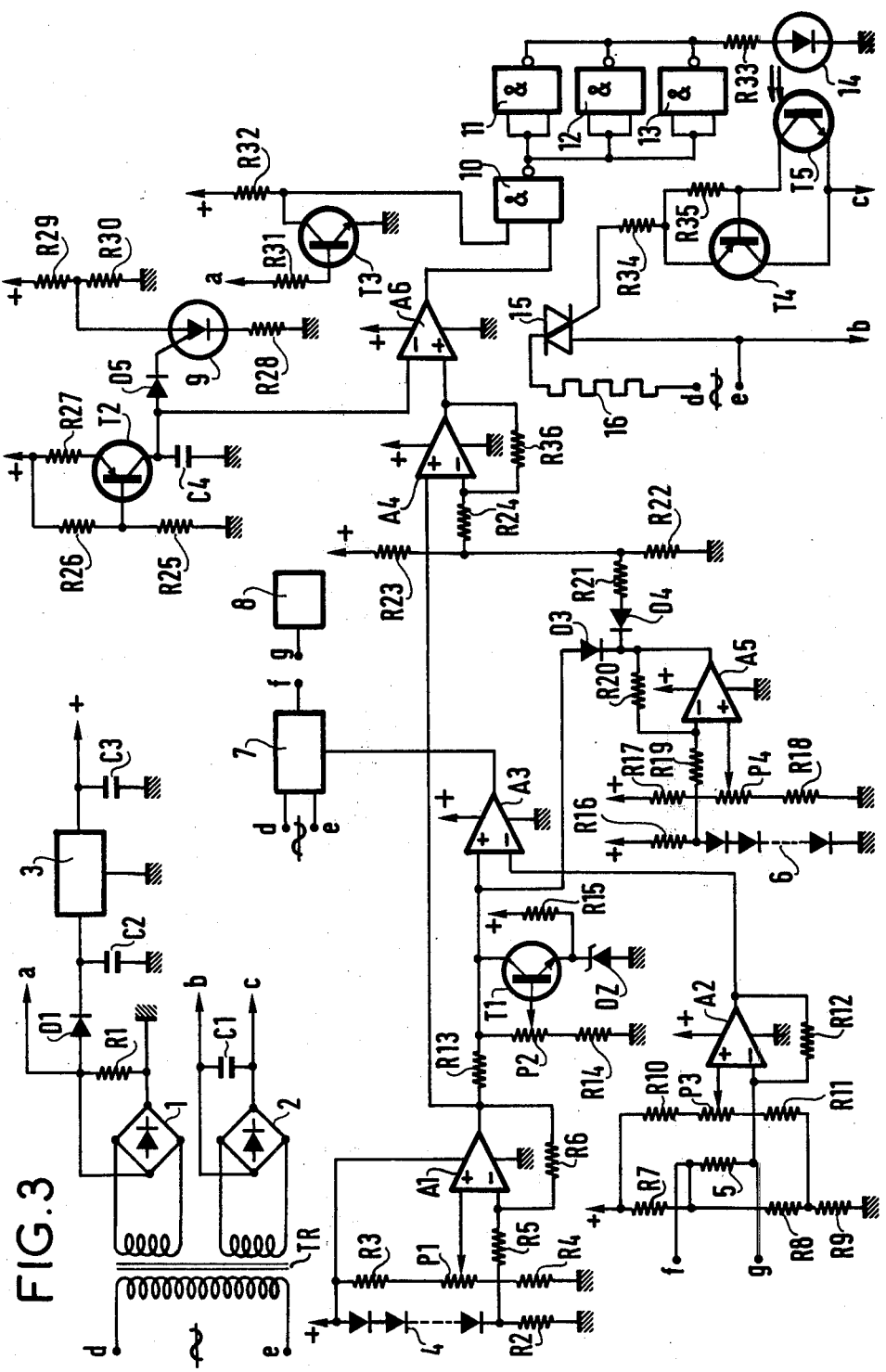
FIG. 3 is an electrical schematic diagram of one embodiment of the device in accordance with the invention.

FIG. 3 illustrates an electronic schematic diagram of a preferred embodiment of the device according to the invention. In FIG. 3, the primary winding of a transformer TR is supplied with alternating current by the line d, e; two rectifiers 1 and 2 are connected to the terminals of the two secondaries, respectively. The two secondaries are necessary in order to electrically isolate the power circuit of the makeup heater from the control circuit, as will be seen later.

One of the leads of rectifier 1 is connected to ground. The other lead is connected through a diode D1 to an input of a current control circuit 3 whose output leads to a positive supply terminal + to provide a regulated current. Capacitors C2 and C3, on either side of the circuit 3, and a resistor R1 regulate the voltage at the output of the rectifier 1. A terminal a is connected directly to the positive output lead of rectifier 1. Rectifier 2, whose voltage is regulated by a capacitor C1, has its output leads connected respectively to terminals b and c.

These two rectifiers supply, respectively, the circuit for controlling the current of the heat pump and the circuit for controlling the actuation of the makeup heater, which may be simply a resistance heater.

A series of ten silicon diodes 4 acts as a sensor to monitor the temperature of the space to be heated. The series of diodes is connected at the anode end to the positive supply terminal and at the other end through a resistor R2 to ground. Their voltage is transmitted via a resistor R5 to one input of a differential amplifier A1. The other input of amplifier A1 is connected to the slider contact of a potentiometer P1 that constitutes a part of a divider, together with resistors R3 and R4, said divider being connected between the positive terminal and ground. As will be seen, the potentiometer determines the value of the preset temperature $t_1$ of the space to be heated. For this reason, its slider contact is accessible to the user and is calibrated in degrees. A feedback resistor R6 between said one input and the output of the differential amplifier A1, and connections of the power leads of A1 to the positive terminal and to ground complete the circuit of amplifier A1.

The cathode voltage of the diode series 4 that corresponds to the actual temperature of the space, and that of the divider determined by the position of the slider contact of the potentiometer P1 that corresponds to the preset temperature of the space are therefore compared by the amplifier A1. This information is transmitted to the input of an amplifier A3 via a resistor R13. A potentiometer P2 and a resistor R14 are connected in series between the junction of the resistor R13 and the amplifier A3 and ground. The slider contact of the potentiometer P2 is connected to the base of an npn transistor T1. The emitter of transistor T1 is connected to the positive supply terminal via a resistor R15 and to the cathode of a Zener diode DZ whose anode is connected to ground. The collector of the transistor T1 is connected to a common junction of a resistance R13 and one input of a differential amplifier A3. Amplifier A3 is energized between the positive supply terminal and ground. Its output is connected to a circuit 7 that feeds a cut-off voltage to a heat pump 8 through terminals f and g, circuit 7 being itself supplied by the lines d, e.

A shunt resistor 5 (see lower left corner of FIG. 3) is inserted between the terminals f and g in such a way that the supply current of heat pump 8 passes through it. One of the terminals of shunt 5 is connected to a common junction of two resistors R7 and R8 which, with a resistor R9, form a voltage divider connected between the positive supply terminal and ground. The other terminal of shunt 5 is connected to one input of an operational amplifier A2. The second input of amplifier A2 is connected to a slider contact of a potentiometer P3 which forms, with resistors R10, R11, and R9, another voltage divider connected between the positive supply terminal and ground. Connections to the positive supply terminal and ground, and a feedback resistor R12 connected between said one input and the output of amplifier A2 complete the circuit of said amplifier. The output of amplifier A2 is connected to the second input of differential amplifier A3.

A second series of silicon diodes 6 senses the temperature of the exchange fluid of the heat pump. Its anode end is connected to the positive supply terminal via a resistor R16, and its cathode end is connected to ground. Its anode voltage is transmitted by way of a resistor R19 to one input of a differential amplifier A5. The second input of amplifier A5 is connected to a slider contact of a potentiometer P4 that forms, with resistors R17 and R18, a voltage divider connected between the positive supply terminal and ground. A feedback resistor R20 connected at one end to the common junction of resistor R19 and the one input of amplifier A5 and on the other end to the output of amplifier A5, and power connections to the positive supply terminal and to ground complete the circuit of amplifier A5.

The output of amplifier A5 is connected via a diode D3 to said one input of amplifier A3 which also is connected to the output of amplifier A1.

The output signal of amplifier A3 determines the value of the heat pump current $I_p$. This value depends, on the one hand, on the amount of amplifier A1 which in turn is proportional to the difference between the voltage of the diodes 4 (and therefore to the actual temperature t of the space to be heated) and the voltage picked up on the potentiometer P1 (which corresponds to the preset temperature t, for the space). However, the Zener diode DZ fixes a voltage which, the moment it has been reached at the base of the transistor T1, renders the transistor conductive and limits the voltage supplied to the one input of A3. In this way, a maximum value of the heat pump supply current is determined. Likewise, the difference between the voltage of the diodes 6 (which corresponds to the exchange fluid temperature of the heat pump) and the voltage picked up on the potentiometer P4 renders the current supplied to the heat pump proportional to the difference between temperature of the exchange fluid of the pump and the preset value determined by the position of the sliding contact of P4. Thus, the current of the pump decreases when the temperature of the fluid decreases.

The control and the adjustment circuits of the direct heating resistor (i.e., the makeup heater) will now be described. This resistor is designated by reference numeral 6 and is supplied with 220 volts AC at the terminals d and e through a triac 15. The control electrode of the triac 15 is connected to a terminal of a resistor R34 whose other terminal is connected to a common junction between a terminal of a resistor R35 and the emitter of a pnp transistor T4.

The collector of T4 is connected to the output terminal c of rectifier 2, and its base is connected to the other terminal of resistor R35. Said other terminal of resistor R35 also is connected to the collector of an npn phototransistor T5 whose emitter is connected to terminal c. The other output terminal b of rectifier 2 is connected to an electrode of the triac 15.

The phototransistor T5 picks up the light of a light-emitting diode (LED) 14 whose cathode is connected to ground and whose anode receives through a resistor R33 the current of three NAND gates 11, 12, and 13 mounted as inverters whose inputs receive a signal from a fourth NAND gate 10.

One of the inputs of gate 10 is connected, on the one hand, to the positive supply terminal via a resistor R32 and, on the other hand, to the collector of an npn transistor T3 of which the emitter is connected to ground and the base is connected to the terminal a by means of a resistor R31.

The other input of gate 10 receives a signal from an operational amplifier A6, one of the inputs of which is connected to the output of an amplifier A4. One of the inputs of amplifier A4 is connected to the output of amplifier A1 and therefore receives a signal proportional to the difference between the actual temperature of the space to be heated and the preset value of said temperature. The other input of amplifier A4 is connected by means of a resistor R24 to a common junction between two resistors R22 and R23 which are series-connected between the positive supply terminal and ground. The common junction of resistors R22 and R23 is also connected through a resistor R21 to the anode of a diode D4 whose cathode is connected to the cathode of diode D3.

A feedback resistor R36 connected between the resistor R24 and the corresponding input of the amplifier A4, on the one hand, and the output of said amplifier, on the other hand, as well as connections between the positive supply terminal and ground complete the circuits of amplifier A4.

The second input of amplifier A6 is connected to the anode of a diode D5 whose cathode is connected to the trigger of a programmable unijunction transistor (PUT) 9. The cathode of PUT 9 is grounded through a resistor R28, and its anode is connected to a common junction between two resistors R29 and R30 which are series-connected between the positive supply terminal and ground. The second input of amplifier A6 is connected to the collector of a pnp transistor T2 which is furthermore connected to ground through a capacitor C4. The emitter of transistor T2 is connected to the positive supply terminal via a resistor R27. Its base is connected to a common junction between two resistors R25 and R26 which are series-connected between the positive supply terminal and ground.

The operation of this portion of the circuit is as follows:

The circuit of PUT 9, diode D5, and transistor T2 supplies a saw-tooth shaped voltage that is superimposed in amplifier A6 onto the continuous voltage supplied by amplifier A4 and thus permits energizing the triac as a function of the information supplied by A4. The circuit of transistor T3 connected to gate 10 prevents the triac from being energized at any time other than a zero crossing of the supply voltage, so as to avoid radio interference.

The output signal of A4 depends on the divergence of the ambient temperature from the value preset by the potentiometer P1, in view of the fact that it depends on the value of the output signal of the amplifier A1. This value is compared to the voltage of the divider R22, R23, which introduces a predetermined differential with respect to the preset space temperature value provided by potentiometer P1. Resistance heater 16 therefore will be activated or deactivated at an ambient temperature that differs from the preset value for actuating or deactuating heat pump 5 by a fixed amount so long as only the resistors R22 and R23 establish the voltage supplied to the amplifier A4. The signal at the output of A4 will then vary continuously as a function of the difference between the ambient temperature and the preset value given by the potentiometer P1, since this is the way that the signal varies at the output of the amplifier A1.

In contrast, if the temperature of the pump exchange fluid, determined by the diodes 6, is such that the output signal of amplifier A5 is lowered, the reference voltage supplied to the amplifier A4 is modified by diode D4 and resistor R21, and the temperature for the deactuating or actuating of the resistor is modified accordingly in order to reduce the difference between the ambient temperature and the preset temperature when the exchange fluid operates at minimum temperature, for instance during intense cold spells.

Referring again to FIGS. 2a and 2b, it can be seen that the schematic diagram given by way of example in FIG. 3 fulfills the functions described. The level of the current in the heat pump is supplied by the transistor T1.

The function $f_1(\theta)$ corresponding to the lowering of the current in the pump when the temperature of the fluid drops is implemented in particular by amplifier A5.

The function $f_2(t)$ corresponding to the reduction of the current of the pump when the ambient temperature increases is obtained from the amplifier A1.

Finally, the difference between the various $I_{Rn}$ curves is obtained by the circuit of the amplifier A4 receiving information from the amplifier A5 (temperature of the fluid) and from the amplifier (ambient temperature of the space).

Figure 4:
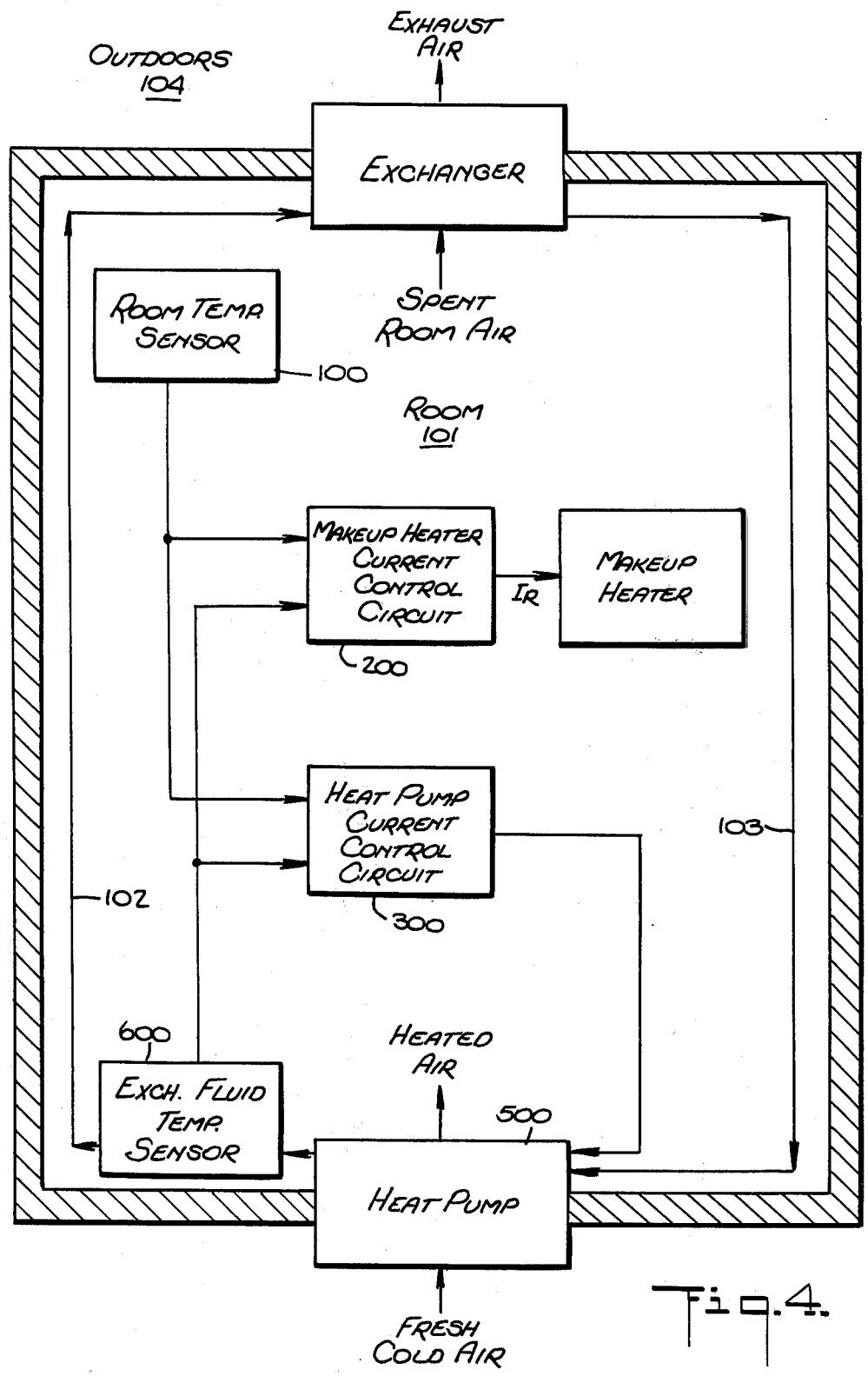
FIG. 4 is a schematic diagram of a heat pump installation according to the invention.

FIG. 4 illustrates a heat pump installation according to the invention, with the same reference numerals as in FIG. 1 for the same components. A room temperature sensor 100 in a room 101 delivers a signal to both a makeup heater current controlling circuit 200 and a heat pump current controlling circuit 300, which control respectively current $I_R$ delivered to a makeup heater 400 and current Ip delivered to a heat pump 500 in response to the room temperature signal and an exchange fluid temperature signal from an exchange fluid temperature sensor 600, as explained above. The exchange fluid circulates through lines 102 and 103 between the heat pump and an exchanger 700, the fluid absorbing heat from a cold source (in this case, the spent indoor air before it is exhausted to the outdoors 104) and releasing heat to the heat pump. The heat pump then uses the released heat to raise the temperature of incoming fresh outdoor air to heat the room 101 to a desired temperature.

What is claimed is:

1. A device for controlling the ambient temperature t of a space heated by means of an electrically actuated heat pump operating with an exchange fluid at a temperature $\theta$, the value of which must not drop below a temperature $\theta_1$, and by means of an electrically actuated makeup heater, $t_1$ being the ambient space temperature desired to be achieved, the device including first means for limiting the current of the heat pump to the lower of two values, the first value being determined by an increasing function $f_1(\theta)$ when $\theta$ is between $\theta_1$ and $(\theta_1+\delta\theta_1)$, $\delta\theta_1$ being a predetermined constant temperature interval of a few degrees, and the second value being determined by a decreasing function $f_2(t)$ when t is between a temperature $t_1-\delta t_1$ and $t_1$, $\delta t_1$ being a predetermined constant temperature interval of a few degrees, and for shutting off the heat pump current when t reaches $t_1$, and second means for controlling the current of the makeup heater, as a decreasing function of t when t is between $t_1-\delta t_2$ and $t_1-(\delta t_2-\delta t_3)$, $\delta t_2$ and $\delta t_3$ being predetermined intervals of a few degrees of temperature, and $\delta t_2-\delta t_3$ being always positive, and for shutting off the current of the makeup heater when t reaches the value $t_1-(\delta t_2-\delta t_3)$, wherein the improvement comprises means for maintaining $\delta t_3$ at a predetermined constant value and means for varying the value of $\delta t_2$ as a function of the current of the heat pump when said pump operates in the predetermined temperature limitation zone for the exchange fluid between $\theta_1$ and $(\theta_1+\delta\theta_1)$.

2. A device according to claim 1, wherein said means for varying the value of $\delta t_2$ operates in such a way that at each value $\theta$ of the exchange fluid temperature the equality $f_1(\theta)=f_2(t_1-(\delta t_2-\delta t_3))$ is maintained, which corresponds to two equal values of the current of the heat pump at the limits of its use.

3. A device according to claim 1 or 2, wherein the first and second means provide linear functions $f_1(\theta)$ and $f_2(t)$, respectively, for the limit values of the current of the heat pump, and the means for controlling the current of the makeup heater, varies said current as a linear function of t.

* * * * *

UNITED STATES PATENT AND TRADEMARK OFFICE
CERTIFICATE OF CORRECTION

PATENT NO. : 4,293,029
DATED : October 6, 1981
INVENTOR(S) : Pierre Godard and Jean-Claude Geoffroy It is certified that error appears in the above—identified patent and that said Letters Patent is hereby corrected as shown below:

Column 2, line 39: last word "in" should be --is--.

Column 3, line 33: after "prevent any" change "rick" to --risk--.

Column 4, line 26: after "$(t_1 - \delta t_1)$ insert a comma --,--.

Column 6, line 12: change "amount" to --output--.

Column 6, line 35: after "meral" change "6" to --16--.

Signed and Sealed this

Ninth Day of February 1982

[SEAL]

Attest:

Attesting Officer

GERALD J. MOSSINGHOFF
Commissioner of Patents and Trademarks